US009729558B2

(12) United States Patent
Liu et al.

(10) Patent No.: US 9,729,558 B2
(45) Date of Patent: Aug. 8, 2017

(54) NETWORK MALICIOUSNESS SUSCEPTIBILITY ANALYSIS AND RATING

(71) Applicant: THE REGENTS OF THE UNIVERSITY OF MICHIGAN, Ann Arbor, MI (US)

(72) Inventors: Mingyan Liu, Ann Arbor, MI (US);
Michael Bailey, Ypsilanti, MI (US);
Manish Karir, Ann Arbor, MI (US);
Jing Zhang, Ann Arbor, MI (US);
Zakir Durumeric, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 105 days.

(21) Appl. No.: 14/627,736

(22) Filed: Feb. 20, 2015

(65) Prior Publication Data

US 2016/0065620 A1 Mar. 3, 2016

Related U.S. Application Data

(60) Provisional application No. 61/942,920, filed on Feb. 21, 2014.

(51) Int. Cl.
*H04L 29/06* (2006.01)

(52) U.S. Cl.
CPC ...... *H04L 63/1408* (2013.01); *H04L 63/1441* (2013.01)

(58) Field of Classification Search
CPC ..... H04L 63/20; H04L 63/101; H04L 63/105; H04L 63/1408; H04L 63/1433; H04L 63/1441; H04L 29/06578; H04L 29/06986; H04L 63/0227; H04L 63/0254; G06F 21/10
USPC .......................................................... 726/1
See application file for complete search history.

(56) References Cited

U.S. PATENT DOCUMENTS

| 5,797,134 A | 8/1998 | McMillan et al. |
| 6,789,046 B1 * | 9/2004 | Murstein ............. G06F 11/3476 |
| | | 702/182 |
| 2001/0056465 A1 * | 12/2001 | Aiso .................... G06Q 10/107 |
| | | 709/203 |

(Continued)

OTHER PUBLICATIONS

Zakir Durumeric, James Kasten, Michael Bailey, and J. Alex Halderman. Analysis of the HTTPS Certificate Ecosystem. In Proceedings of ACM IMC, pp. 291-304, Barcelona, Spain, Oct. 2013.

(Continued)

*Primary Examiner* — William Goodchild
(74) *Attorney, Agent, or Firm* — Marshall, Gerstein & Borun LLP

(57) ABSTRACT

Network security and robustness is analyzed by developing correlations among network maliciousness observations to determine attack susceptibility. Network traffic is analyzed at the autonomous system (AS) level, among connected Internet Protocol (IP) routing prefixes, to identify these observations. The traffic is monitored for any of a number of specified mismanagement metrics. Correlations among these metrics are determined and a unified network mismanagement metric is developed, indicating network susceptibility to potentially malicious attack.

28 Claims, 11 Drawing Sheets

(56) References Cited

U.S. PATENT DOCUMENTS

| | | | | |
|---|---|---|---|---|
| 2002/0078233 | A1* | 6/2002 | Biliris et al. | H04L 29/06 709/238 |
| 2003/0212903 | A1* | 11/2003 | Porras et al. | H04L 12/2602 726/13 |
| 2005/0166049 | A1* | 7/2005 | Touitou et al. | H04L 63/08 713/170 |
| 2010/0275263 | A1* | 10/2010 | Bennett et al. | G06F 21/577 726/25 |

OTHER PUBLICATIONS

M. Patrick Collins, Timothy J. Shimeall, Sidney Faber, Jeff Janies, Rhiannon Weaver, Markus De Shon, and Joseph Kadane. Using Uncleanliness to Predict Future Botnet Addresses. In Pro-ceedings of ACM IMC, pp. 93-104, New York, NY, USA, Oct. 2007. ACM.

Amogh Dhamdhere and Constantine Dovrolis. Ten years in the evolution of the internet ecosystem. In Proceedings of ACM IMC, pp. 183-196, New York, NY, USA, Oct. 2008. ACM.

Nan Du, Bin Wu, Xin Pei, Bai Wang, and Liutong Xu. Community detection in large-scale social networks. In Proceedings of the 9th WebKDD and 1st SNA-KDD 2007, WebKDD/SNA-KDD '07, pp. 16-25, New York, NY, USA, Aug. 2007. ACM.

Zhiyun Qian, Zhuoqing Morley Mao, Yinglian Xie, and Fang Yu. On Network-level Clusters for Spam Detection. In NDSS, Feb. 2010.

Kuai Xu, Zhi-Li Zhang, and Supratik Bhattacharyya. Profiling Internet Backbone Traffic: Behavior Models and Applications. Pro-ceedings of SIGCOMM, 35(4):169-180, Aug. 2005.

Zakir Durumeric, Eric Wustrow, and J. Alex Halderman. ZMap: Fast Internet-Wide Scanning and its Security Applications. In Proceedings of the 22nd USENIX Security Symposium, pp. 605-620, Washington, D.C., Aug. 2013.

G. Lindberg. Anti-Spam recommendations for SMTP MTAs. BCP 30/RFC 2505, Feb. 1999.

A. Hubert and R. Van Mook. Measures for Making DNS More Resilient against Forged Answers. RFC 5452, Jan. 2009.

K. Soska and N. Christin. Automatically Detecting Vulnerable Websites Before They Turn Malicious. In Proceedings of the 23rd USENIX Security Symposium, San Diego, CA, Aug. 2014.

Olivier Thonnard, Leyla Bilge, Anand Kashyap, and Martin Lee. Are You at Risk? Profiling Organi-zations and Individuals Subject to Targeted Attacks. In Financial Cryptography and Data Security, Jan. 2015.

Jing Zhang, Ari Chivukula, Michael Bailey, Manish Karir, and Mingyan Liu. Characterization of Blacklists and Tainted Network Traffic. In Proceedings of PAM, Hong Kong, Mar. 2013.

Jing Zhang, Zakir Durumeric, Michael Bailey, Manish Karir, and Mingyan Liu. On the Mismanage-ment and Maliciousness of Net-works. In Proceedings of the Network and Distributed System Security Symposium (NDSS '14), San Diego, CA, Feb. 2014.

Andrew Y. Ng, Michael I. Jordan, and Yair Weiss. On Spectral Clustering: Analysis and an algorithm. In NIPS, pp. 849-856, Dec. 2001.

Christopher M Bishop et al. Pattern Recognition and Machine Learning, vol. 1. Springer New York. (2006).

Andrew Gelman, John B. Carlin, Hal S. Stern, and Donald B. Rubin. Bayesian Data Analysis, Second Edition. Chapman and Hall/CRC, 2 edition, Jul. 2003.

Brandon Oselio, Alex Kulesza, and Alfred Hero. Multi-layer graph analytics for dynamic social net-works. CoRR, Dec. 2013.

Liu et al.; "Cloudy with a Chance of Breach: Forecasting Cyber Security Incidents:" USENIX SYMPOSIUM, Aug. 2015.

Barr et al., Common DNS operations and configuration errors, RFC 1912 (1996).

Borda, "Memoire sur les elections au scrutin," Histoire de l'Academie Royale des Sciences, 1784 (with English mechanical translation).

Bradner, "The internet standards process—revision 3", RFC 2026/BCP 9 (1996).

Damas et al., Preventing use of recursive nameservers in reflector attacks, RFC 5358/BCP 140 (2008).

Durumeric et al., ZMap: fast internet-wide scanning and its security applications, Proc. 22nd USENIX Security Symposium (2013).

Ferguson et al., Network Ingress Filtering: Defeating Denial of Service Attacks which employ IP Source Address Spoofing, RFC 2827/BCP 38 (2000).

Hubert et al., measures for making dns more resilient against forged answers, RFC 5452 (2009).

Klensin, Simple mail transfer protocol, RFC 5321 (2008).

Lindberg, Anti-spam recommendations for SMTP MTAs, BCP 30/RFC 2505 (1999).

Mahajan et al., Understanding BGP misconfiguration, Proc. of SIGCOMM '02, Pittsburgh, Pennsylvania (Aug. 19-23, 2002).

Open Resolver Project—Results from 3 Months of Scans, down-loaded from the Internet at <https://www.nanog.org/sites/default/files/tue.lightning3.open_resolver.mauch_.pdf> (2013).

Zhang et al., On the mismanagement and maliciousness of net-works, NDSS '14, San Diego, California (Feb. 23-26, 2014).

* cited by examiner

FIG. 2

| Symptoms | Best Current Practices | Functions | Attacks | Dataset |
|---|---|---|---|---|
| Open Recursive Resolvers | BCP 140/RFC 5358 | Naming Infrastructure | DNS Amplification | Global |
| DNS Source Port Randomization | RFC 5452 | Naming Infrastructure | DNS Cache Poisoning | Global |
| Consistent A and PTR records | RFC 1912 | Naming Infrastructure | - | Partial |
| BGP Misconfiguration | RFC 1918, RFC 6598 | Routing Infrastructure | - | Global |
| Egress Filtering | BCP 38/RFC 2897 | Transit | - | Partial |
| Untrusted HTTPS Certificates | RFC 5246, RFC 2459 | Web Application | Man-in-the-middle | Global |
| Open SMTP Mail Relays | RFC 2505 | Mail Application | Spam | Global |
| Publicly Available out-of-band Management Devices | Manufacturer's Guideline | Server | Compromising Hosts | Global |

FIG. 4

| | Open resolver | Port randomization | PTR record | BGP misconfig. | Egress filtering | HTTPS certificate | SMTP relay | IPMI cards |
|---|---|---|---|---|---|---|---|---|
| Open resolver | - | 0.35 (<0.01) | 0.09 (<0.01) | 0.17 (<0.01) | 0.09 (<0.01) | 0.46 (<0.01) | 0.14 (<0.01) | 0.26 (<0.01) |
| Port randomization | 0.35 (<0.01) | - | 0.14 (<0.01) | 0.07 (<0.01) | 0.04 (=0.02) | 0.23 (<0.01) | 0.16 (<0.01) | 0.26 (<0.01) |
| PTR record | 0.10 (<0.01) | 0.15 (<0.01) | - | 0.03 (<0.01) | 0.01 (=0.46) | 0.00 (=0.37) | 0.11 (<0.01) | 0.15 (<0.01) |
| BGP misconfig. | 0.17 (<0.01) | 0.07 (<0.01) | 0.03 (<0.01) | - | 0.04 (=0.04) | 0.16 (<0.01) | 0.02 (<0.01) | 0.03 (<0.01) |
| Anti-spoofing | 0.09 (<0.01) | 0.04 (=0.02) | 0.01 (=0.46) | 0.04 (=0.04) | - | -0.02 (=0.32) | 0.14 (<0.01) | 0.10 (<0.01) |
| HTTPS certificate | 0.46 (<0.01) | 0.23 (<0.01) | 0.00 (=0.37) | 0.16 (<0.01) | -0.02 (=0.32) | - | 0.06 (<0.01) | 0.15 (<0.01) |
| SMTP relay | 0.14 (<0.01) | 0.16 (<0.01) | 0.10 (<0.01) | 0.02 (<0.01) | 0.14 (<0.01) | 0.06 (<0.01) | - | 0.26 (<0.01) |
| IPMI cards | 0.26 (<0.01) | 0.26 (<0.01) | 0.15 (<0.01) | 0.03 (<0.01) | 0.10 (<0.01) | 0.15 (<0.01) | 0.26 (<0.01) | - |

Moderate Correlation    Weak Correlation (a) Open recursive resolvers (b) DNS source port randomization (c) PTR records (d) BGP misconfiguration (e) Egress filtering (f) HTTPS certificates (g) Open mail relays (h) IPMI cards

| RBL Type | RBL Name |
|---|---|
| *Spam* | BRBL[43], CBL[44], SBL[45], SpamCop[46], WPBL[47], UCEPROTECT[48] |
| *Phishing/Malware* | SURBL[49], PhishTank[50], hpHosts[51] |
| *Active attack* | Darknet scanners list, Dshield[52], OpenBL[53] |

| Metric | Coefficient | P-value | Interpretation |
|---|---|---|---|
| Open recursive DNS resolvers | 0.59 | < 0.01 | strong positive |
| DNS source port randomization | 0.45 | < 0.01 | moderate positive |
| Consistent A and PTR records | 0.20 | < 0.01 | weak positive |
| BGP misconfiguration | 0.19 | < 0.01 | weak positive |
| Lack of Egress filtering | 0.04 | < 0.01 | no correlation |
| Untrusted HTTPS certificates | 0.44 | < 0.01 | moderate positive |
| Open SMTP mail relays | 0.23 | < 0.01 | weak positive |
| Mismanaged IPMI cards | 0.22 | < 0.01 | weak positive |
| Overall | 0.64 | < 0.01 | strong positive |

*FIG. 8*

|  | Country GDP | GDP per capita |
|---|---|---|
| Rank of mismanagement | 0.28 (<0.01) | 0.39 (<0.01) |
| Rank of maliciousness | 0.27 (<0.01) | 0.36 (<0.01) |

*FIG. 9*

|  | # of customers | # of peers |
|---|---|---|
| Rank of mismanagement | -0.30 (<0.01) | -0.14 (<0.01) |
| Rank of maliciousness | -0.27 (<0.01) | -0.11 (<0.01) |

*FIG. 10*

| Metric | Coefficient | P-value | Interpretation |
|---|---|---|---|
| Open recursive DNS resolvers | 0.54 | <0.01 | Strong positive |
| DNS source port randomization | 0.24 | <0.01 | Weak positive |
| Untrusted HTTPS certificates | 0.39 | <0.01 | Moderate positive |
| Open SMTP mail relays | 0.15 | <0.01 | Weak positive |
| Mismanaged IPMI cards | 0.18 | <0.01 | Weak positive |

*FIG. 12*

NETWORK MALICIOUSNESS SUSCEPTIBILITY ANALYSIS AND RATING

CROSS-REFERENCE TO RELATED APPLICATION

This application claims priority to U.S. Provisional Application No. 61/942,920, entitled "Network Maliciousness Susceptibility Analysis and Rating," filed Feb. 21, 2014, which is hereby incorporated herein in its entirety.

STATEMENT OF GOVERNMENTAL INTEREST

This invention was made with government support under CNS1330142, CNS1255153, CNS0831174, CNS0916390, CNS1111699 and CNS0751116 awarded by the National Science Foundation, support under N00014-09-1-1042 awarded by the Navy/ONR, support under D08PC75388 awarded by the Department of Homeland Security/ST and support under FA8750-12-2-0314 and FA8750-12-2-0235 awarded by the Air Force Research Laboratory/IF. The Government has certain rights in the invention.

FIELD OF THE INVENTION

The present disclosure relates to computer network and, more particularly, to techniques for analyzing computer networks to determine susceptibility to malicious attacks.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

One of the primary challenges facing the network operations community is security. Proprietary networks with limited or no access to the Internet can provide a somewhat secure network. However, being disconnected from the Internet is not practical, as systems increasingly need to be interconnected to provide utility. And even attempts to control who gains access to network are limited, in part, by the sophistication of cyber thieves but also in part by the network mismanagement.

Misconfigured networks have long been attractive resources for hackers, and anecdotal evidence suggests that mismanaged networks are often taken advantage of for launching external attacks, posing a risk not only to themselves, but to the Internet as a whole. One example of this can be seen in DNS amplification attacks in which attackers utilize open DNS resolvers to flood target hosts with a large number of DNS responses. These amplification attacks have long been observed in the wild and continue to occur with increasing scale and impact. These attacks are innately dependent on both widely-distributed misconfigured open DNS resolvers and the ability of attackers to forge request packets. In spite of calls by the Internet security community to address both of these issues by following standard deployment practices, serious attacks continue to occur. As a result, these events are frequently described in terms of economic externalities: a situation where a party could efficiently prevent harm to others—that is, a dollars' worth of harm could be prevented by spending less than a dollar on prevention—but the harm is not prevented because the party has little or no incentive to prevent harm to strangers.

To help assess networks and the likelihood of their susceptibility to attack, some reputation systems/lists have been developed, such as SPAM sender's lists, Botnet Command and Control lists, Malware hosting domains lists, DNS open resolver's lists and others have seen rapid adoption as an integral part of operational network security. These host reputation systems simply publish a list of IP addresses that have been identified as origins of malicious behavior. Historically and in general, such reputation systems have evolved in isolation and are often maintained by various organizations independently of each other. These lists can be used to identify infected hosts in a given network for cleanup or in block lists to prevent traffic to and from such hosts. Malicious behavior of hosts is often a reflection of the general security posture of a given network. Network reputation (as opposed to host reputation) is a measure that aims to capture the overall security and health condition of a network. Such a measure, if established globally and uniformly, will allow the Internet community to easily interpret the relative security posture of a given network, and to adopt the appropriate local security policy that is consistent with the perceived risk when communicating with other networks. More importantly, this will provide the incentive for the administrators and operators of a network to enhance its security image by adopting better and more effective security measures. Ultimately the health of a global network relies on the due diligence of a large number of network administrators. Providing them with the right incentive is thus crucial in any effort to enhance network security on a global level.

SUMMARY

In accordance with an example, a computer-implemented method for auditing a computer network to determine susceptibility to malicious attack, the method includes: monitoring traffic of the computer network for a plurality of mismanagement metrics, where each of the plurality of mismanagement metrics results from one or more mismanagement symptoms of the computer network, and where the traffic is monitored at the network level of the computer network; aggregating the traffic of the computer network at the network level and identifying, from the aggregation, one or more correlations between the plurality of mismanagement metrics; from among the identified one or more correlations between the plurality of mismanagement metrics, determining a unified mismanagement metric for the computer network, the unified mismanagement metric indicating a network-traffic level indication of the mismanagement of the computer network; and storing the unified mismanagement metric for use in comparison to a listing of potential maliciousness attacks.

In accordance with another example, a system comprises: one or more processors and one or more memories, the one or more memories storing instructions that when executed by the one or more processors, cause the one or more processors to; monitor, in a monitoring module stored in the one or more memories, traffic of the computer network for a plurality of mismanagement metrics, where each of the plurality of mismanagement metrics results from one or more mismanagement symptoms of the computer network, and where the traffic is monitored at the network level of the computer network; aggregate, in an aggregation module stored in the one or more memories, the traffic of the computer network at the network level and identify, in a correlation module, from among the aggregation, any correlations between the plurality of mismanagement metrics; from among the identified correlations between the plurality of mismanagement metrics, determine, in an assessment module, a unified mismanagement metric for the computer network, the unified mismanagement metric indicating a network-traffic level indication of the mismanagement of the computer network; and store the unified mismanagement metric for use in comparison to a listing of potential maliciousness attacks.

In some examples, the plurality of mismanagement metrics are (e.g., the presence of) Open Recursive Resolvers, DNS Source Port Randomization, Consistent A and PTR records, BGP Misconfiguration, Egress Filtering, Untrusted HTTPS Certificates, SMTP server relaying, Publicly-Available Out-of-band Management Cards, and/or open NTP servers.

In some examples, aggregating the traffic of the computer network at the network level includes aggregating traffic data collected from the autonomous system level of the computer network.

In some examples, aggregating the traffic of the computer network at the network level includes aggregating traffic data collected from an administrative boundary determined for the computer network.

In some examples, monitoring of the computer network is done in real time.

In some examples, monitoring of the computer network is done at periodic intervals or in response to triggering event.

In some examples, correlating the unified mismanagement metric with any of a plurality of potential malicious network attacks is performed.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 illustrates a table summarizing mismanagement metrics and third-party, public data sources used for validation, in an example:

FIG. 4 illustrates a table listing correlation coefficients and p-values between different mismanagement symptoms, in an example:

FIG. 8 illustrates a table of correlation coefficients and p-values between mismanagement and maliciousness, showing there is a statistically significant correlation between our mismanagement symptoms and maliciousness, in an example;

FIG. 9 illustrates a table of correlation coefficient (p-value) based on country GDP and GDP per capita for both mismanagement and maliciousness for networks, in an example;

FIG. 10 illustrates a table of correlation coefficient (p-value) based number of customers and number of peers for both mismanagement and maliciousness for networks, in an example;

FIG. 12 illustrates a table of aggregation at BGP prefix level between mismanagement and maliciousness, illustrating correlation coefficient, p-values, and interpretation, in an example;

DETAILED DESCRIPTION

Figure 1:
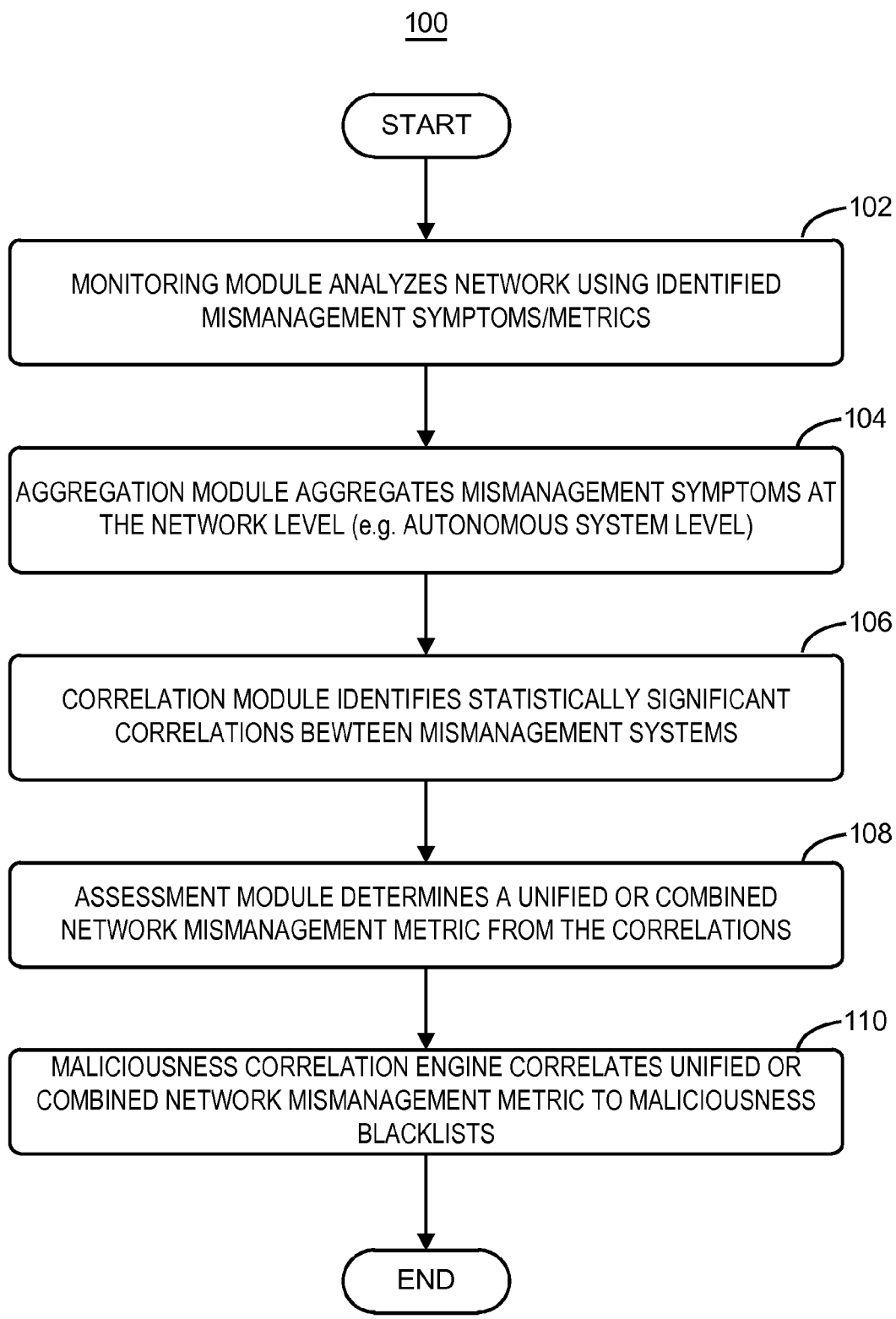
FIG. 1 is a flow diagram of a process for network susceptibility assessment.

The present application describes techniques for analyzing network security and robustness to assist network managers in warding off malicious attacks. The techniques correlate network mismanagement with malicious attack susceptibility, providing network administrators with identifiable network management procedures to implement and providing network users, insurers, etc. with a reputation-based assessment of a network. Whereas conventional techniques, at best, focus on examining network security by analyzing traffic at the host level, the techniques herein are able to analyze and assess security by examining network operations at network level, and in particular at the autonomous system (AS) level. The AS is a collection of connected Internet Protocol (IP) routing prefixes under the control of one or more network operators that presents a common, clearly defined routing policy to the Internet. This level of analysis, it has been found, provides a more robust and complete analysis of network susceptibility to malicious attack, when combined with the correlation determinations described herein.

The techniques herein may be used at other network aggregation levels, for example, at the network prefix level, enterprise network level which would include a series of prefixes, or arbitrarily-defined network levels. In contrast to looking at the link level or host level, analyzing traffic at the network level allows for better aggregation of data analytics and better overall assessment of network security, especially for large networks that may contain many different hosts only a few of which are susceptible to (or the intended object of) malicious attack.

As discussed, in some examples, the techniques herein may be used as part of a network security prediction scheme capable of automated network analysis and assessment. The techniques, in some examples, may be used as part of a network-security rating assessment, for comparing a network to others in terms of various metrics. Using a subset of the correlations determined herein, a multifactorial metric can be determined and used for rating network security. This rating may be influenced by network operations overall, operations of particular hosts (IP addresses) on the network, or some combination thereof. That is, while techniques are described that are able to look at network level conditions for security assessment, embedded within the correlations derived from those network level conditions may be host specific conditions, since individual hosts within a network may be more susceptible to malicious attack than other hosts. The term hosts, as used herein, refers to any addressable computer or other device on a network, such as devices assigned their own IP address. Hosts may include personal computers, desktop computers, portable computers, mobile devices such as smartphones, tablet computing devices, personal data assistants, wearable smart devices, servers, and network accessible storage devices. Hosts may also include network devices, such as devices that operate as sub-networks, within a wider area network.

With the increase in data sharing and access across networks, network auditing has become increasingly important. To share data, network administrators are often tasked with completing an audit or questionnaire about their network security. Audits are typically backward looking and rely upon the expertise and honesty of another network's administrator. The present techniques allow for a more objective assessment (and prediction and rating) of the external networks of others. By automatically assessing network performance at various levels (e.g., IP address, blocking of IP addresses, organization level, etc.) and by looking at metrics related to intensity of issues (e.g., average presence of network on blacklist over "n" days, frequency on the list, number of days, etc.) a more robust and complete picture may be obtained of another entity's network. Moreover, the picture can be provided using a service that monitors the other entity's network, thereby reducing or even eliminating the use of audits.

The present techniques are also able to give spatial characteristics of the network, e.g., how well the network stacks up against other networks, categorizations of networks and network types, etc.). The present techniques can be implemented for real-time network monitoring, periodic automated monitoring, or scheduled monitoring. In some examples, the techniques may adjust this monitoring time based on network performance, e.g., more frequently monitoring a network when it is determined that the network has a particular malicious susceptibility.

Initially, the techniques examine, in an automated manner, network mismanagement as a predictor of maliciousness susceptibility. Here, network mismanagement refers to the failure to adopt suitable guidelines or policies when administrating and operating networks. The techniques examine the relationship of such misconfiguration with apparent network maliciousness. In some examples, the techniques identify which fraction of IP addresses in the network fall within one of a set of reputation blacklists—12 such blacklists are discussed herein, by way of example.

Rather than focusing on how individual vulnerabilities influence the likelihood of a host becoming compromised (e.g., CVE-2008-4250 resulting in Conficker infections), the present techniques examine how symptoms of network mismanagement, such as the presence of open recursive resolvers or instances of observed BGP misconfiguration, relate to organizational reputation built from externally observed malicious behavior, such as malware hosting and SPAM. While some of the examined features may be proxies, ultimately, the techniques demonstrate the relationship between network management and apparent network maliciousness, or reputation on the Internet.

FIG. 1 illustrates a process 100 for network assessment. Initially, at a block 102 a network is examined for prevalence of varied network mismanagement symptoms, e.g. using a monitoring module 220 (see, FIG. 13), having stored therein the various network mismanagement symptoms. In other examples, the symptoms may be stored in a database accessible to the monitoring module 220.

At a block 104, an aggregation module 222 of a network analysis system 200 (see, FIG. 13) aggregates these misconfigured systems at the autonomous system (AS) level. For example, the module may receive the distribution of the mismanagement symptoms from block 102 across ASes and then determine relationships between the symptoms at the AS level, and in between the systems and potential malicious attacks. In other examples, the aggregation module 222 may aggregate misconfigured systems at any natural administrative boundary, predetermined or determined at the time of aggregation.

At the block 104, the aggregation module 222 may determine, for example, that a small number of the total ASes exhibit a significant amount of the mismanagement for any given symptom. For example, for several ASes, all of the mail servers within the AS may be configured as open relays or, for hundreds of ASes, none of the DNS resolvers within the AS perform source port randomization. The aggregation module 222 collects this information at the block 104.

At a block 106, a correlation module 224 identifies any statistically significant correlations between the mismanagement symptoms within an AS. For example, there may be moderate, positive correlations between the frequency of occurrence of open DNS resolvers within an AS and both (i) the lack of port randomization as well as (ii) the prevalence of self-signed HTTPS certificates.

At a block 108, these statistically-significant symptoms are combined into an overall mismanagement metric by an assessment module 226. The determined mismanagement metrics from various different tests of a network and/or across multiple different networks are provided to a maliciousness correlation engine 228 for assessment at block 110.

The data from different assessments for different networks may be used to examine how different regions, topological locations, and business relationships between ASes relate to a network's mismanagement. For example, examining networks in different geographic locations, the assessment module 226 may determine that networks in Latin and South America and Africa are more likely to be mismanaged than those in North America. In any event, with the network mismanagement metrics determined by the block 108, the metrics may be provided to maliciousness correlation engine 228 for correlating the metrics to apparent maliciousness of networks. The correlation engine 228, for example, can leverage a number of global blacklists (e.g., 12 global blacklists are used in the present examples) based on spam, phishing, malware and scanning activity to infer network maliciousness. Using the correlation engine 228, we have identified a statistically significant, strong positive correlation (0.64 correlation coefficient <0.01 p-value) between mismanagement and apparent maliciousness.

Symptoms of Mismanagement

There are many symptoms that externally reflect poor network management. In an example, we analyzed eight of these symptoms, listed in FIG. 2. While these symptoms do not necessarily comprehensively describe all manners in which a network could be mismanaged, we choose to focus on these particular symptoms because they are well-documented in published Request for Comments (RFCs) and Best Current Practices (BCPs), S. Bradner, "The internet standards process—revision 3," RFC 2026/BCP 9, 1996, and are part of the security community's best practices. We attempt to focus on characteristics that are symptomatic of overall network mismanagement rather than on specific vulnerabilities that could be used for mounting an attack. This is intended to reduce any bias between mismanagement symptoms and maliciousness metrics.

To be analyzed by the monitoring module 220 at block 102, a range of symptoms ranging from BGP routing stability to the management and patching of SMTP, HTTPS, and DNS servers were included in the monitoring. This range of symptoms has several merits. First, it provides a global perspective of an organization's network management. For example, different teams potentially manage different services; and by analyzing a range of different symptoms, the process 100 can focus on the overall organizational network mismanagement rather than a single misconfigured service. Second, the analysis of multiple symptoms allows the process 100 to analyze the relationships between different symptoms.

Corresponding to the example provided below, the monitoring module 220, at block 102, may automatically examine real time or stored network data for the following mismanagement symptoms: Open Recursive Resolvers, DNS Source Port Randomization, Consistent A and PTR records, BGP Misconfiguration, Egress Filtering, Untrusted HTTPS Certificates, SMTP server relaying, Publicly-Available Out-of-band Management Cards, and open NTP servers. This list is not exhaustive. While in various examples below, the monitoring module 220 is described as scanning and analyzing stored historical data, it will be appreciated that the monitoring module 220 may also operate by scanning and analyzing network performance data in real time.

Open Recursive Resolvers

Open DNS resolvers respond to recursive queries for any domain and pose a direct threat to the Internet due to their role in DNS amplification attacks. In an amplification attack, an attacker sends simple DNS queries to an open resolver with a spoofed source IP address. While the DNS lookup request itself is small, the response to the victim is much larger and, as a result, the responses overwhelm the victim. BCP 140, J. Damas and F. Neves, "Preventing use of recursive nameservers in reflector attacks," RFC 5358/BCP 140, 2008, provides several recommendations for how to configure open resolvers to mitigate these threats. Ultimately, recursive lookups should be disabled unless specifically required and, when enabled, limited to intended customers.

In order to analyze the misconfiguration of open resolvers, in an example, the monitoring module 220 analyzed active scans of the public IPv4 address space by sending a DNS query to every public address on port 53 and capturing the responses. While the monitoring may be done in real time, in some examples the monitoring module 220 may collect previously stored data, e.g., data provided by the Open Resolver Project which has been performing these scans weekly since April, 2013, and has identified more than 30 million open resolvers. Detailed data collection methodology and preliminary results can be found in their recent presentation at NANOG, "Open Resolver Project—Results from 3 months of active scans," http://www.nanog.org/sites/default/files/tue.lightning3.openresolver.mauch.pdf, 2013.

DNS Source Port Randomization

DNS cache poisoning is a well-known attack in which an attacker injects bogus DNS entries into a recursive name server's local cache. Traditionally, DNS resolvers used a randomized query ID in order to prevent cache poisoning attacks. However, in 2008, Dan Kaminsky presented a new subdomain DNS cache poisoning attack that has two new advantages. First, it extends the window of attack because there is no valid reply from the authoritative name server with which to compete. Second, the multiple identical queries allow attackers to brute-force the 16-bit transaction ID that was previously relied upon for preventing these types of attacks.

Current best practices (RFC 5452, A. Hubert and R. V. Mook, "Measures for making DNS more resilient against forged answers," RFC 5452, 2009) recommend randomizing the source port when performing DNS lookups in order to prevent these brute force attacks. In this configuration, a DNS server will use a large range of source ports instead of a single preset port, which significantly increases the search space for an attacker. For example, if a DNS server utilizes 2,000 source ports, the search space would increase from 64,000 to more than 100 million possibilities. Most popular DNS packages have already issued patches that implement source port randomization.

In order to determine whether networks have patched their DNS resolvers with source port randomization, we analyze the set of DNS queries made against VeriSign's.com and .net TLD name servers on Feb. 26, 2013. In total, we observed approximately 5 billion queries from 4.7 million DNS resolvers.

In an example, the source ports utilized to make DNS queries against these TLD servers were monitored and it was inferred that resolvers that only utilize the default source port without implementing source port randomization were misconfigured. Monitoring identified that 226,976 resolvers, which accounted for 4.8% of total resolvers in this sample, did not utilize source port randomization.

Consistent A and PTR Records

DNS supports several types of records, of which Address (A) and Pointer (PTR) records are two of the most common. An A record is used to map a hostname to an IP address. A PTR record resolves an IP address to a canonical name.

One merit of PTR records is that they facilitate the validation of connecting clients and are widely used for detecting and blocking malicious IP addresses. For example, SMTP servers often discard messages from IP addresses without a matching PTR or MX record. The DNS operational and configuration guidelines (RFC1912, D. Barr, "Common DNS operational and configuration errors," RFC 1912, 1996) dictate that every A record should have a corresponding PTR record, "Importance of PTR records for reliable mail delivery," http://www.mxpolice.com/email-security/importance-of-ptr-records-for-reliable-mail-delivery/.

The monitoring module 220 utilized two datasets in order to estimate the global status of DNS records: the .com and .net second level domains stored in the VeriSign zone files and the domains in the Alexa Top 1 Million popular websites.

In order to determine which A records have associated PTR records, the monitoring module 220 performed a DNS query for each domain in our two datasets, finding 116 million A records, and then performed a reverse DNS lookup of the IP addresses appearing on these 116 million A records. We find that 27.4 million A records, which account for 23.4% of A records we queried, did not have a matching PTR record.

BGP Misconfiguration

Publicly routed networks utilize Border Gateway Protocol (BGP) in order to exchange advertised routes. A router can announce a new route for a prefix or withdraw a route when it is no longer available. Routers are expected to not send updates unless there are topological changes that cause its advertised routes to change. However, misconfiguration and human error can result in unnecessary updates, which can potentially lead to both security vulnerabilities and downtime.

Mahajan et al. (R. Mahajan, D. Wetherall, and T. Anderson, "Understanding BGP misconfiguration," in Proceedings of SIGCOMM '02, 2002) note that 90% of short-lived announcements (less than 24 hours) are caused by misconfiguration. This is because policy changes typically operate on human time-scales, while changes due to misconfiguration typically last for a much shorter time.

In order to measure BGP misconfigurations, we use this simple heuristic in coordination with BGP updates from 12 BGP listeners in the Route Views project, University of Oregon, "Route Views Project," http://www.routeviews.org/. The monitoring module 220 tracked the time period for every new route announcement during the first two weeks of June, 2013 and inferred that routes that last less than a day were likely caused by misconfiguration. We detected 42.4 million short-lived routes, which account for 7.8% of announced routes during the period of two weeks.

Egress Filtering

Attackers often spoof source IP addresses to achieve anonymity or as part of DDoS attacks. In order to counter these attacks, it has been a best practice since 2000, to perform egress filtering as documented in BCP 38 (P. Ferguson and D. Senie, "Network ingress filtering: Defeating denial of service attacks which employ IP source address spoofing," RFC 2827/BCP 38, 2000).

In order to measure which networks have implemented egress filtering, the monitoring module 220 examined data from the Spoofer Project (http://spoofer.cmand.org/index.php.), which utilizes approximately 18,000 active clients to send probes to test for the presence of egress filtering. The monitoring module 220 specifically analyzed data from Apr. 29, 2013 and checked in which netblocks an arbitrary routable source IP address can be spoofed. Because spoofed IP addresses are primarily used by attackers, netblocks that do not implement address filtering to be misconfigured were considered. The dataset from April 29th contained results for 7,861 netblocks, of which 35.6% have not implemented egress filtering. The status of the remaining 195,000 netblocks is unknown.

Unmated HTTPS Certificates

HTTPS sites present X.509 certificates as part of the TLS handshake in order to prove their identity to clients. When properly configured, these certificates are signed by a browser-trusted certificate authority.

Now that browser-trusted certificates are available for free from several major providers, the best practice is for public websites to use browser-trusted certificates. As such, the monitoring module 220 was made to consider the presence of untrusted certificates as a potential symptom of misconfiguration. However, a large number of sites utilize self-signed certificates or certificates that have not been validated by a trusted authority.

In order to understand the state of HTTPS certificate utilization, we consider a scan of the HTTPS ecosystem that was completed as part of the ZMap network scanner project, Z. Durumeric, E. Wustrow, and J. A. Halderman, "ZMap: Fast Internet-wide scanning and its security applications," in Proceedings of the 22nd USENIX Security Symposium, 2013. In this scan, Durumeric et al. performed a TCP SYN scan on port 443 of the public IPv4 address space on Mar. 22, 2013 using the ZMap network scanner. It then performed a follow-up TLS handshake with hosts that responded on port 443, and collected and parsed the presented certificate chains using libevent and OpenSSL.

Using this dataset, the monitoring module 220 considered whether presented certificates are rooted in a browser-trusted certificate authority or are not browser trusted (i.e. self-signed or signed by an unknown certificate authority). We found 33 million hosts with port 443 open, 21.4 million hosts who successfully completed a TLS handshake, and 8.4 million distinct X.509 certificates. Among these certificates, only 3.2 million (38%) were browser-trusted, and only 10.3 million (48%) of the hosts presented browser-trusted certificates.

SMTP Server Relaying

Open mail relays are SMTP servers that do not perform any filtering on message source or destination and will relay e-mail messages to any destination. These servers are frequently abused by spammers in order to avoid detection or to offload traffic onto third parties. Given their consistent abuse, the Internet community strongly recommends against their use (RFC 2505—G. Lindberg, "Anti-Spam recommendations for SMTP MTAs," BCP 30/RFC 2505, 1999—and RFC 5321—J. Klensin, "Simple mail transfer protocol," RFC 5321, 2008).

In order to investigate the prevalence of open mail relays, the monitoring module 220 performed a TCP SYN scan of the IPv4 address space for port 25 using ZMap on Jul. 23, 2013 and attempted the initial steps of an SMTP handshake in order to determine whether the server would reject the sender or receiver. After determining whether the server would accept the message, the connection was terminated without sending any mail.

The scan identified 10.7 million servers with port 25 open of which 7.0 million identified themselves as SMTP servers. Of the responsive SMTP servers, 6.2 million explicitly rejected our sender, 433,482 terminated the connection or timed out, and 22,284 SMTP servers accepted the message, identifying them as open mail relays.

Publicly-Available Out-of-Band Management Cards

Out-of-band management cards that allow remote control of power, boot media, and in some cases, remote KVM capabilities, are now commonplace on servers. Most of these management cards are implementations of the Intelligent Platform Management Interface (IPMI) industry standard, but come under a variety of names, including Dell's Remote Access Card (iDRAC), HP Integrated Lights Out (iLO), and Super Micro's Base Management Card (BMC).

While these interfaces are a valuable tool for systems administrators, they also pose a severe security risk if publicly available on the Internet. These devices have recently been found to be riddled with vulnerabilities, and manufacturers explicitly recommend that the devices be isolated on a private management network and not be made available on the public Internet. As such, we consider any publicly-available management card to be a misconfiguration.

In order to measure the public availability of these IPMI cards, the monitoring module 220 considered the TLS certificate data set collected by Durumeric et al. by searching for known default certificates presented by IPMI cards manufactured by Dell, HP, and Super Micro. In this dataset, IPMI cards hosted on 98,274 IP addresses were found.

In this example, these eight symptoms were chosen because, it was believed, they would expose mismanaged networks and, for the most part, are not vulnerabilities that will directly influence the blacklists considered later in this work. We further focused on symptoms that have clear and accepted best practices, which have been documented by the security community. In other examples, a more expansive list of symptoms may be monitored for.

Pervasive failures in implementing common security practices in the symptoms were found, several of which could, by themselves, result in easily exploitable vulnerabilities. Specifically, in these example implementation, the present techniques identified (1) 27 million open recursive resolvers, (2) 226,976 DNS resolvers that have not been patched to use source port randomization, (3) 27.4 million A records that do not have matching PTR records, (4) 42.4 million short-lived BGP routes, (5) 35.6% of the tested netblocks that have not implemented egress filtering, (6) 10.2 million HTTPS servers using untrusted certificates, (7) 22,284 SMTP servers that allow open mail relays, and (8) 98,274 public accessible IPMI cards.

Aggregation to Determine Global Mismanagement of Network

The aggregation module 222 examines these mismanagement systems at the AS level, where aggregation may be achieved in a number of different ways at the block 104.

Abstracting Networks

Via the block 104, the aggregation module 222 may employ any suitable methodology for aggregating networks. These include AS-level aggregation, BGP routed prefix, aggregating hosts by administrative domains defined by an authoritative name server. In an example, the aggregation module 222 aggregated hosts at the AS level because several of the mismanagement symptoms may only be available at this granularity. Generally, the aggregation types selected (and one or more may be employed at block 104) are selected at least partially based on the mismanagement symptoms and/or based on the desired combined mismanagement metrics.

Distribution of Misconfigured Systems

FIG. 3 illustrates a distribution of each of type of mismanagement symptom (interchangeably referred to herein as misconfiguration system) based on host IP addresses in each AS, in a sample assessment of network security. Networks were ranked by the normalized number of misconfigured systems, with the breakdown of vulnerabilities in FIG. 3. As we identified, mismanagement is different between different networks; symptoms of misconfiguration are typically concentrated in a small number of networks.

Next how each metric is normalized and the results of aggregating specific vulnerabilities by AS are discussed.

Figure 3A:
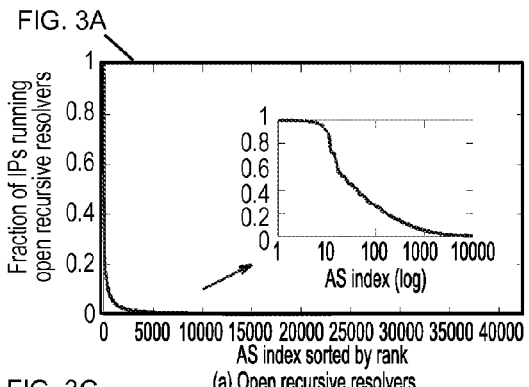
FIG. 3A illustrates a plot of a normalized distribution of a misconfigured system in an autonomous system with regards to a fraction of open recursive solvers, in an example.

Open recursive resolvers: The process 100 may include normalizing the number of open recursive resolvers by total number of IP addresses announced by the AS. FIG. 3A shows the normalized number of open recursive resolvers (i.e., fraction of IP addresses that are running open recursive resolvers) for each AS, ranked by a decreasing order. At block 104, the aggregation module 222 finds that in the top 10 most misconfigured ASes, close to 100% of the ASes' advertised addresses are running misconfigured open resolvers. While we do not know for sure why this is occurring, we suspect that these networks are centrally managed and hosts are similarly configured. Beyond these several cases, 477 ASes (1.2%) have more than 10% of IPs running misconfigured open recursive resolvers. The long-tail distribution shows that approximately 95% of all ASes are well-managed, with a small number of no open recursive resolvers.

Figure 3B:
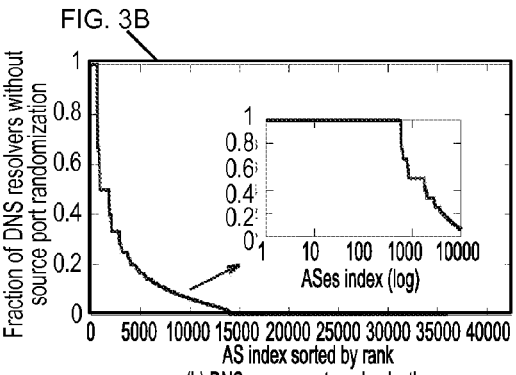
FIG. 3B illustrates a plot of a normalized distribution of a misconfigured system in an autonomous system with regards to Domain Name Service (DNS) source port randomization, in an example.
Figure 3C:
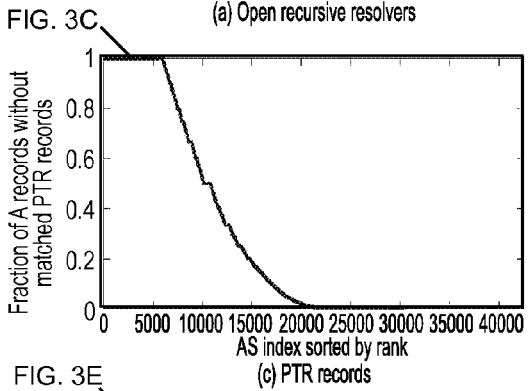
FIG. 3C illustrates a plot of a normalized distribution of a misconfigured system in an autonomous system with regards to pointer (PTR) records, in an example.

DNS source port randomization: At block 104, the aggregation module 222 normalizes the number of DNS resolvers without source port randomization by the total number of unique resolvers in the AS. The results are shown in FIG. 3B. There are 14,102 ASes (33%) with at least one misconfigured DNS server. Among these, the top 584 most misconfigured ASes have 100% of their resolvers misconfigured, and more than 50% of the resolvers do not implement source port randomization in the top 1,762 ASes.

Consistent A and PTR records: We define the normalized number of unmatched PTR records as the fraction of the AS' A records that do not have a corresponding PTR record. We show the results of this normalization in FIG. 3C. At least one A record is mismatched in 21,418 ASes (49%). A large number of ASes have a disproportionally higher fraction of their A records mismatched: none of the A records in the top 5,929 ASes have corresponding PTR records and more than half of the A records are mismatched in the top 10,863 ASes.

Figure 3D:
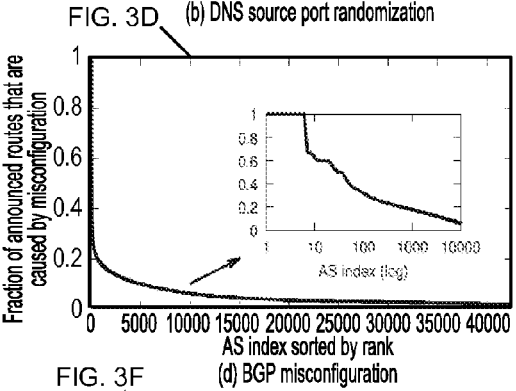
FIG. 3D illustrates a plot of a normalized distribution of a misconfigured system in an autonomous system with regards to Border Gateway Protocol (BGP) misconfiguration, in an example.

BGP misconfiguration: In order to normalize BGP misconfigurations, we consider the fraction of routing announcements originating from an AS that is misconfigured. Results are shown in FIG. 3D. Unlike the previously discussed metrics, in this example, the analysis did not find clearly divided groups of ASes. Instead, it was found that many ASes that announce a similar number of short-lived routes. Only 37 ASes have more than half of their updated routes as short-lived, and only a few ASes have less than 5% of their updates that are caused by misconfiguration. We suspect that this is because the causes of BGP misconfiguration are numerous and complex.

Figure 3E:
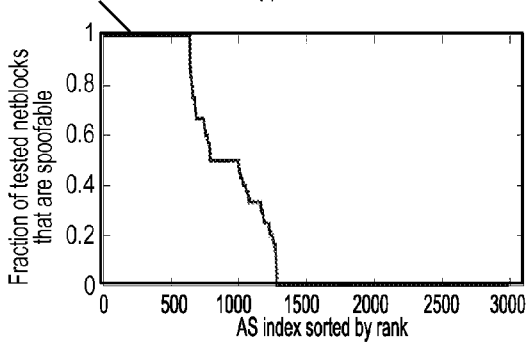
FIG. 3E illustrates a plot of a normalized distribution of a misconfigured system in an autonomous system with regards to egress filtering, in an example.
Figure 3F:
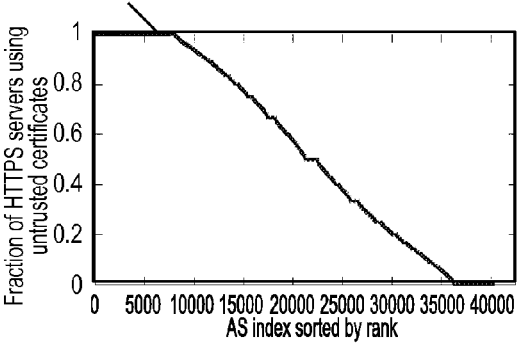
FIG. 3F illustrates a plot of a normalized distribution of a misconfigured system in an autonomous system with regards to Hyper Text Transfer Protocol Secure (HTTPS) certificates, in an example.

Egress Filtering: Ideally, at the block 104, the number of netblocks without egress filtering would be normalized by the total number of netblocks in an AS. However, our dataset only includes information for a fraction of the netblocks in 2,987 ASes. Therefore, we estimate the normalized number by calculating the fraction of known netblocks that are spoofable in these 2,987 ASes. As shown in FIG. 3E, approximately half of these ASes do not have any netblocks that allow address spoofing, while all of the tested netblocks in the top 638 ASes do not implement egress filtering and are spoofable.

This particular symptom may not accurately represent the distribution of networks without egress filtering. First, the process 100 can only estimate the deployment of source address validation in 6% of all ASes. Second, the results may be biased given that the tested netblocks in a particular AS may not accurately represent the behavior of the entire AS.

However, even with these limitations, we believe that the existence of egress filtering is a symptom worth considering when discussing mismanaged networks due to the potential abuse for attacks.

Untrusted HTTPS certificates: At the block 104, the aggregation module 222 normalizes the servers that present untrusted certificates with the total number of HTTPS servers seen in each AS. The results are plotted in FIG. 3F. While there is less risk associated with using self-signed certificates, we find that a large number of ASes contain servers with a self-signed certificate. Specifically, more than 36,000 ASes (82%) have at least one mismanaged HTTPS server. In 8,042 ASes, all hosts serving HTTPS on port 443 use a self-signed or an otherwise untrusted certificate.

Figure 3G:
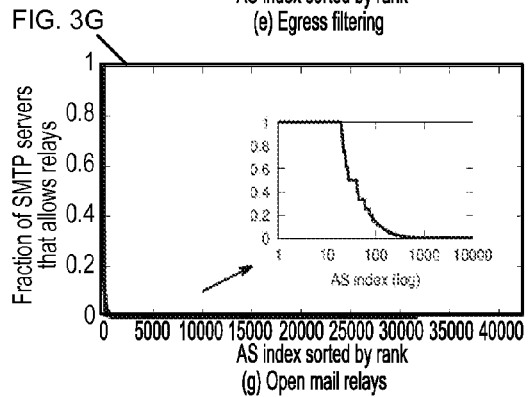
FIG. 3G illustrates a plot of a normalized distribution of a misconfigured system in an autonomous system with regards to open mail relays, in an example.

Open SMTP mail relays: At the block 104, the aggregation module 222 normalizes open mail relays with the total number of SMTP servers in each AS, where the per-AS normalized number of open mail relays is shown in FIG. 3G. In comparison to other mismanagement symptoms, we find that mail servers are relatively well maintained. Only 1,328 ASes hosted open mail relays and only 135 ASes contained more than 10% of mail servers that are misconfigured.

Figure 3H:
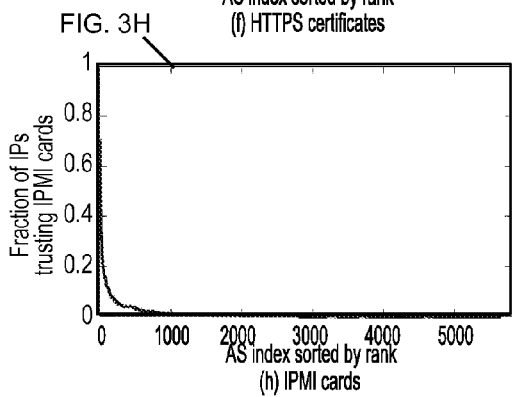
FIG. 3H illustrates a plot of a normalized distribution of a misconfigured system in an autonomous system with regards to Intelligent Platform Management Interface (IPMI) cards, in an example.

Publicly available IPMI devices: We find relatively few publicly available IPMI cards in comparison to the previously listed metrics; in total we find IPMI cards in 5,648 ASes. Normalized by the total number of IP addresses of the ASes, the number is tiny (FIG. 3H). But, a few ASes are relatively poorly managed-2% of IP addresses have been detected with IPMI cards in the top 44 ASes.

Correlations Between Symptoms

As discussed in reference to block 106, the correlation module 224 determines if any relationships exist between the different mismanagement symptoms within an AS. To quantify the relationship between two symptoms, a Spearman's rank correlation test was used within the operations of block 106. That correlation test includes measuring the statistical dependence between two ranked variables. In some examples, the rank-based correlation was used rather than value-based tests because of the differences in scale between ASes and the varying implications of each mismanagement symptom. Further, rank-based correlation is a nonparametric measure that does not require data from a normal distribution. Although in other examples a value-based correlation may be examined for.

The result of Spearman's test is a value between -1 and 1, where a negative value indicates a negative relationship between two metrics and positive value indicates a positive relationship. For any nonzero value, we perform a hypothesis test with a 95% confidence level in order to determine whether the observed correlation is significant (i.e., if p-value <0.05). For a significant nonzero correlation coefficient, the larger the absolute value, the stronger the relationship. According to Cohen's guidelines (J. Cohen, Statistical Power Analysis for the Behavioral Sciences, Routledge Academic, 1988), values with absolute correlation coefficients from 0.1 to 0.3 can be considered weakly correlated, 0.3 to 0.5 moderately correlated, and 0.5 to 1.0 to be strongly correlated.

The pair-wise correlation coefficients and p-values are shown in FIG. 4, in an example network assessment. In this example, a statistically significant correlation was determined between 25 of the 28 comparisons at a 95% confidence level. Of these, two of the pairs were moderately correlated, 14 pairs were weakly correlated, and the remaining correlations were trivial. Of the symptoms, at block 106, the correlation module 224 found the strongest correlation within vulnerability-related symptoms: open DNS resolvers, failure to implement source port randomization, and using untrusted HTTPS certificates.

Missing PTR records and BGP misconfiguration have the weakest correlation to other metrics. In the case of the PTR records, this may be caused by the biased dataset. For BGP misconfiguration, we expect to see little correlation with other metrics due the complexity and potential inaccuracy of measurements.

We expected to find the lack of egress filtering significantly correlated with other symptoms, but that was not observed in this example. However, we note that the relatively size sample size of this metric may have skewed its results. Specifically, the measured ASes in our egress filtering dataset are biased toward fewer misconfigured systems as indicated by other metrics.

One explanation for the correlation between these technically disparate mismanagement symptoms is that they are likely impacted by the organizational culture of network security management. In other words, while we expect that disparate systems are managed by different groups within an organization, we suspect that members in an organization are influenced by its culture, including its hiring process, daily operating procedures, and general awareness of security vulnerabilities.

Unified Network Mismanagement Metric

As discussed at the block 108, the assessment module 226 determines a unified, combined network mismanagement metric. The assessment module 226 analyzes the mismanagement of networks as a whole using the eight symptoms described above. The assessment module 226 may first combine the individual symptoms into an overall mismanagement metric, although other combinations may be performed. The rationale is that while each symptom may be an inaccurate measure of the AS mismanagement, the combination of disparate metrics provides a more holistic view of the network. Using a unified, i.e., global, metric as determined at block 108, the process 100 can then consider different attributes of ASes including their geographic region and topological role.

Combining Symptoms: The assessment module 226 may combine different symptoms into a single metric using various different techniques. The module may access a database of stored combination protocols, for example. One technique is the process described J. C. de Borda, "Me'moire sur les elections au scrutin," Histoire de l'Acade'mie Royale des Sciences, 1784, which is a linear combination algorithm for aggregating ranked results. This provides an overall score for each AS that is equivalent to an unweighted average of the AS' rank in each individual symptom.

In this example, the metrics on ingress filtering and PTR records were excluded given that they only represent a small number of ASes. The process 100 thus may determine which metrics to excluded based on the identified correlation data from the correlation module 224 at block 106. The assessment module 226 may rank ASes by their overall mismanagement scores from the worst to best managed.

Figure 5:
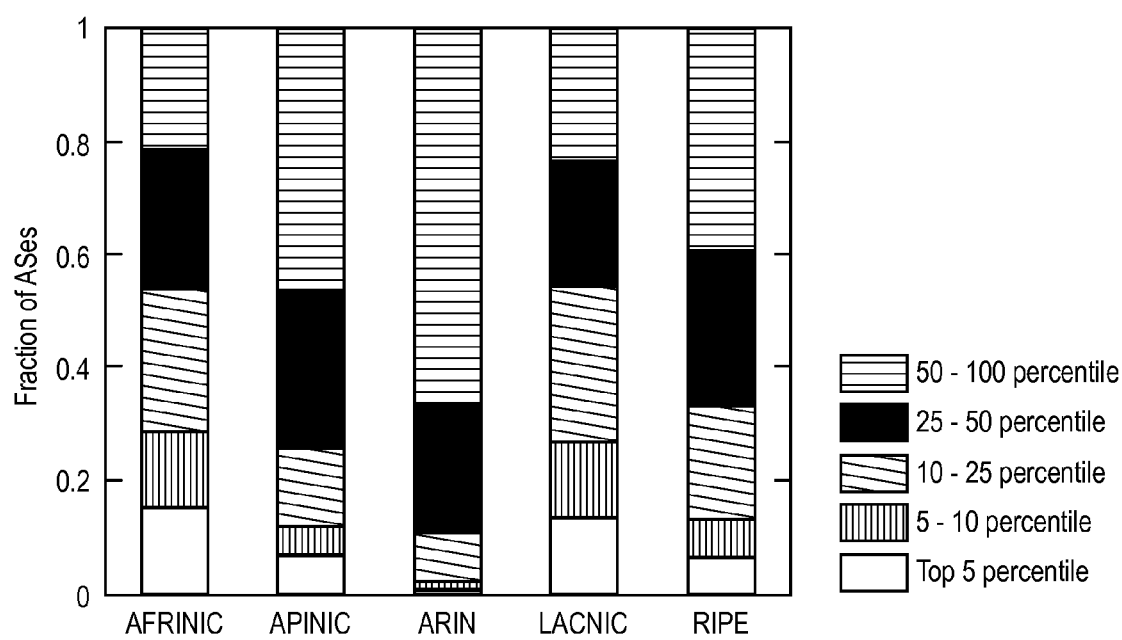
FIG. 5 illustrates regional differences in mismanagement, showing that networks assigned by ARIN are relatively well managed, while a larger fraction of networks under AFRINIC and LACNIC are poorly managed.

Geographical Distribution: at the block 108, the assessment module 226 may also consider the geographic distribution of mismanagement by mapping ASes to their geographical regions using the WHOIS services provided by Team Cymru (http://www.team-cymru.org/Services/ip-to-asn.html.). To compare mismanagement of ASes, we group ASes into five groups based on their rank percentile in the overall mismanagement metric. We show the distribution of ASes in these five groups in FIG. 5.

We find that networks allocated by American Registry of Internet Numbers (ARIN) are relatively well-managed, and that ASes in African Network Information Center (AFRINIC) and Latin American and Caribbean Network Information Center (LACNIC) have a disproportionally large number of poorly-managed ASes. Approximately 15% of their ASes fall into the 5th percentile of mismanaged ASes, and 60% fall into the 25th percentile of mismanaged ASes.

Mismanagement and Maliciousness

The maliciousness correlation engine 228, at block 110, determines whether there is a relationship between the eight mismanagement symptoms measured and the apparent maliciousness of networks based on twelve IP reputation blacklists. While the engine 228 may examine any IP reputation blacklists, in this example, IP blacklists that identify hosts based on sending SPAM messages, hosting phishing websites, and performing malicious port scans were chosen. In total, these blacklists, listed in FIG. 6, contained approximately 160 million unique IP addresses.

Maliciousness of Networks

The maliciousness engine 228 may quantify an AS maliciousness in three steps. First, the maliciousness engine 228 may aggregate the blacklists in order to find the set of IP addresses that appear on any blacklist Second, the maliciousness engine 228 may aggregate these IP addresses by origin AS. And finally, the maliciousness engine 228 may normalize the number of malicious IPs with the number of announced addresses in each AS. In this sense, the maliciousness engine 228 may consider an IP address to be malicious based on its appearance on any blacklist. In this example, the engine 228 does not consider an address to be any more or less malicious based on the number of blacklists on which it appears. In other examples, the engine 228 could be so configured.

Figures 6, 7:
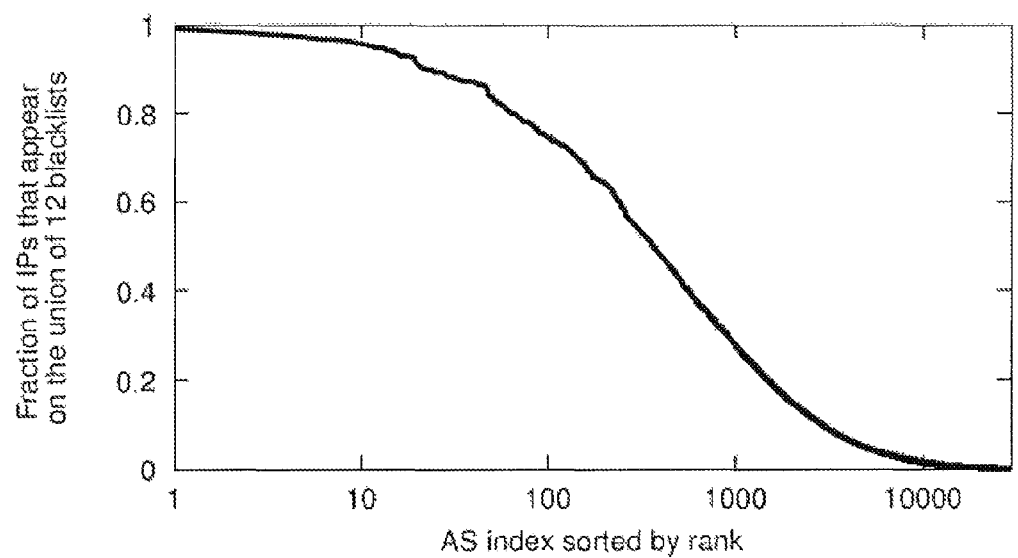
FIG. 6 illustrates a table summarizing blacklists, in an example.
FIG. 7 is a plot of maliciousness of autonomous systems, in an example.

The maliciousness engine 228 found that 29,518 ASes (67%) have at least one blacklisted IP address. FIG. 7 depicts the maliciousness of ASes sorted in descending order. Similar to the distribution of misconfigured systems, the maliciousness of ASes varies greatly: the top 350 ASes have more than 50% of their IP addresses blacklisted, while the bottom ASes have a negligible number of blacklisted IPs.

In order to determine the relationship between mismanagement and maliciousness, the maliciousness engine 228 examined correlation between the two metrics. First, a Spearman's correlation was calculated between each individual mismanagement symptom and maliciousness. All of the symptoms examined have a statistically significant positive relationship with networks' apparent maliciousness at a 95% confidence level, as shown in FIG. 8. In particular, the vulnerability-related symptoms (e.g., open DNS resolvers, DNS source port randomization, and HTTPS server certificates) have a moderate to strong correlation with maliciousness. We find that the correlation between anti-spoofing and maliciousness is negligible, which we believe is due to biased datasets.

Interestingly, with the present techniques we found that the aggregated mismanagement metric has the strongest correlation with maliciousness. Given that the overall mismanagement metric is an approximation of the true management posture of a network, this observation shows that researchers need to consider a more holistic view of network health rather than only consider specific vulnerabilities or symptoms.

The correlation engine 228 was able to automatically identify correlations based on geographic region, as shown in FIG. 9 and based on the number of customers and number of peers, as shown in FIG. 10.

Figure 11:
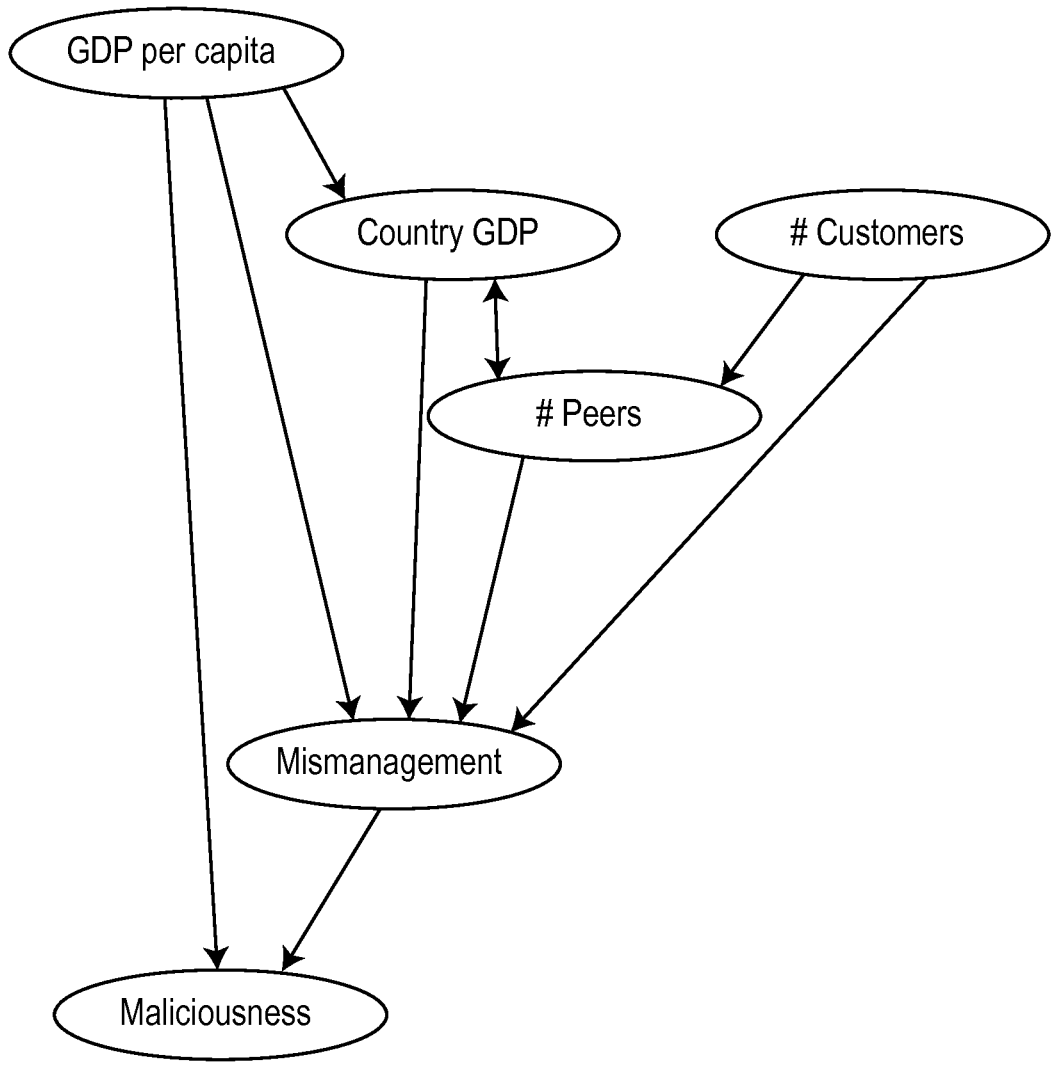
FIG. 11 illustrates inferred causal relationships, in an example.

We examined the correlations by controlling for social and economic factors. FIG. 11 depicts the inferred causal relationships within the dataset and indicates that mismanagement is a cause for maliciousness when controlling for social and economic factors. The edges between social and economic factors and mismanagement indicate correlations and probable causations, but there is no direct relationship between maliciousness and these factors (except BGP per capita) when controlled by mismanagement. Therefore, the possible causal chain indicates that economic factors are correlated to management level, which ultimately influences the security and apparent maliciousness of a network.

As discussed, aggregation may be performed at other network levels than the AS level. FIG. 12 depicts the results from an example aggregation at a more granular level, specifically at the routed block or authoritative name server. As shown, considering the correlation between three of the mismanagement symptoms and the global maliciousness metric at the routed block granularity, there were slight differences between the level of correlation (e.g., the correlation between DNS port randomization moves from a moderate positive correlation to a weak positive correlation while other correlations remain unchanged). Yet, ultimately, there continues to be strong positive correlations for all of the mismanagement symptoms.

Figure 13:
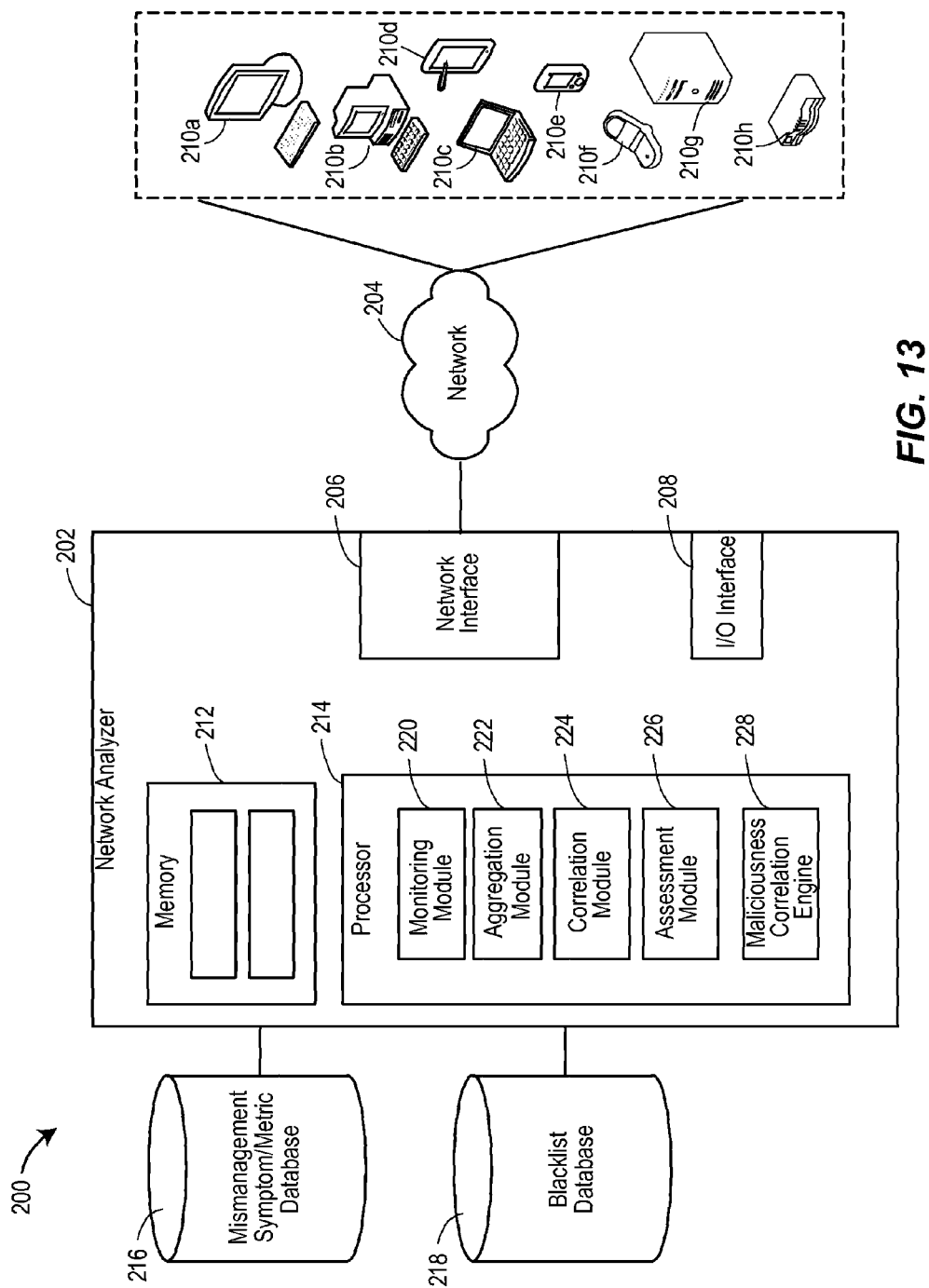
FIG. 13 is a schematic view of an apparatus for network analysis system for maliciousness susceptibility analysis, in an example.

FIG. 13 illustrates a network analysis system 200 as may be used to implement the techniques described herein. The system 200 includes network analyzer 202 that performs monitoring and analysis of one or more networks 204 (only one shown). By way of example, the network 204 may include any number of addressable host devices, which include, but are not limited to, desktop computers 210a, 210b, laptop computers 210c, personal data assistants, 210d, 210e, cellular phones 210f, networks servers 210g, routers 210h, and/or other devices. The analyzer 202 interfaces with the network monitoring network level traffic and data through the network interface 206.

External input and output devices, such as monitors, keyboards, touch pads, etc. may be connected through the I/O interface 208.

The network analyzer 202 further includes a memory 212 and a process 214. External databases that include a mismanagement symptom/metric database 216 and a blacklist database 218 are also shown separately connected to the network analyzer, for example through a database or other network interface (not shown).

The processor 214 includes a series of modules for executing processes as described herein, including, the monitoring module 220, the aggregation module 222, the correlation module 224, and the assessment module 226. Also included with the processor 214 in the illustrated example is the maliciousness correlation engine 228.

Figure 14:
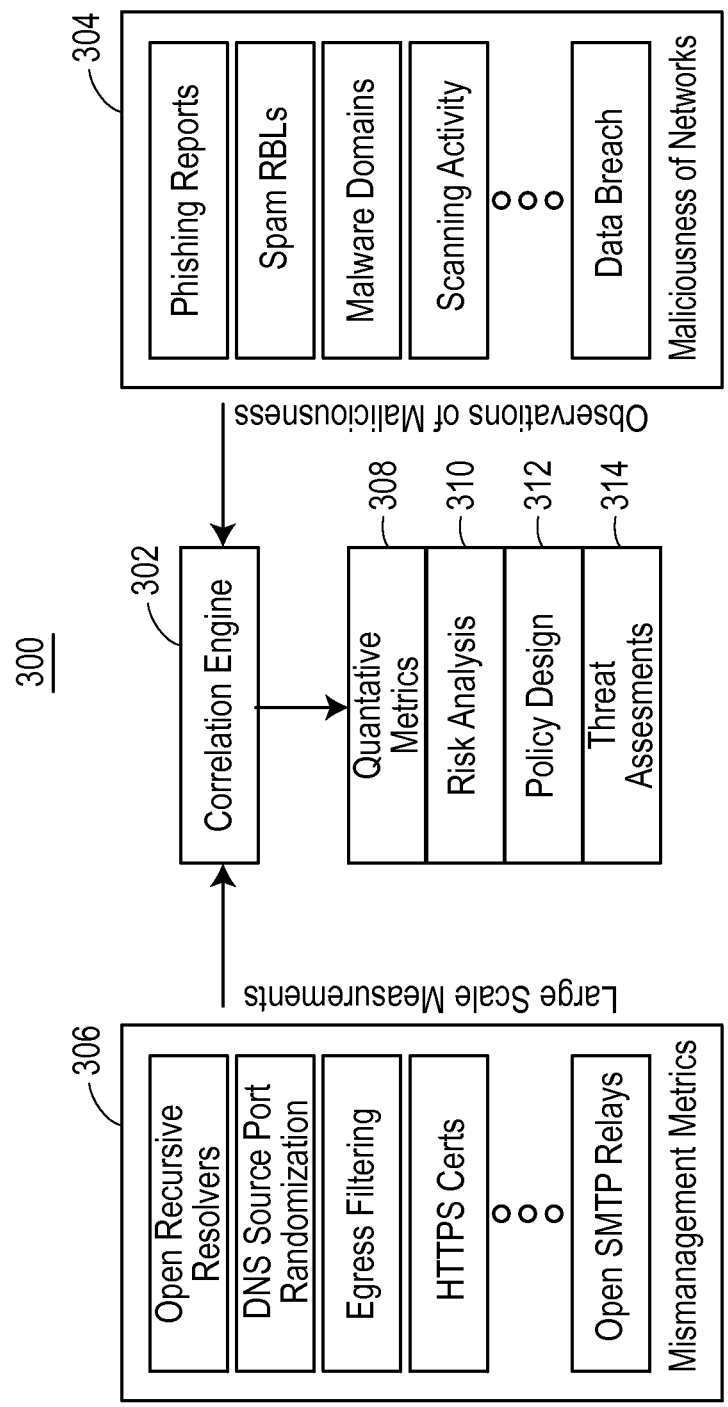
FIG. 14 is a schematic view of part of a risk analysis system that maybe used network analysis, auditing, risk analysis, network management/policy design, in an example.

FIG. 14 illustrates risk analysis system 300 that may implement the techniques described herein, in particular for auditing a network and performing a risk analysis to predict network susceptibility and alter network management/policy design. A correlation engine 302, which perform operations similar to that of the process 100 and the processor 214, receives large scale measurements of network data, in the form of mismanagement metrics (symptoms) via a mismanagement module 306. The module 306 may represent continuous real time monitoring of network level traffic or stored, historical data of previous network monitored data, or some combination thereof. In the illustrated example, the module 306 provides data on open recursive resolvers, DNS source port randomization, egress filtering, HTTPS certifications, open SMTP relays, and the other mismanagement metrics described herein.

The correlation engine 302, which may be stored on a network server, network connected personal computer, cloud computing cluster, etc. is also connected to the maliciousness module 304 which may identify observations of maliciousness on the monitored network, including phishing reports, SPAM RBLs, malware domains, scanning activity, data breach reports, and other malicious or potentially malicious activities.

With the received data, the correlation engine 302 is able to determine mismanagement metrics 308, as described above, as well as perform a risk analysis 310, determine a resulting policy design 312, and threat assessment 314.

The risk analysis 310 includes examining the unified network mismanagement metric against mismanagement metrics for another networks or historical mismanagement metrics for the current network under examination to determine if the network is at particular risk for malicious attack. The risk analysis 310 may be determined from performing a static threshold comparison or from performing a dynamic comparison that in which risk analysis changes with changed conditions in the network or in other networks. The correlation engine 302 may employ machine learning tools to dynamically adjust the risk levels, in some examples.

The correlation engine 302 may be configured to warn network administrators when the risk analysis is too high for the network, for example through a visual indication on a monitor, or through automated message via email or short message service (SMS), etc. and addressed to the appropriate designee.

In some examples, the risk analysis 310 is automatically provided to a policy design stage 312, in which those network management (policy) decisions that are automated may be controlled to adjust network management, based on the risk analysis. For example, traffic to or from networks that have a higher risk profile might be subject to deep packet inspection or otherwise subjected to special handling.

In some examples, the correlation engine 302 is further able to provide an security rating to the network through the threat assessments stage 314. This security rating may result from the risk analysis comparison performed at the stage 310. The rating would serve as a metric by which networks could be compared against each other. Generally speaking, the rating would be based on a uniformed network level analysis, in view of the techniques described herein. Although, more detailed ratings or multi-dimensional ratings may be provided, for example a rating may also include a network level rating as well as host level ratings for hosts on the network, link level ratings, etc.

The ratings can provide auditing third parties, such as third party networks, insurance companies, business auditors, and the like, a way of assessing network security, externally, without relying on auditing data from the administrators of the network at issue. The ratings also allow real time network assessment, as well as the ability compile a rating profile of the historical security of the network. Such ratings can also provide a concrete mechanism to measure and quantify the benefits of implementing more secure policies in a network.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A computer-implemented method for auditing a computer network to determine susceptibility to malicious cyber attacks, the method comprising:

actively querying individual hosts of the computer network via data communications that are separate from data traffic sent to and received by the individual hosts during normal operation;

analyzing network data collected in response to the queries for a presence of a plurality of mismanagement and misconfiguration symptoms represented by a range of mismanagement metrics associated with the individual hosts within the computer network the plurality of mismanagement and misconfiguration symptoms being indicative of a failure to implement adequate network security practices or a deviation from known best security practices;

aggregating the range of mismanagement metrics associated with the individual hosts within the computer network at a particular network level granularity including (i) an autonomous system (AS) level, (ii) a network prefix level, (iii) an enterprise network level, or (iv) an arbitrarily-defined network level, the particular network level granularity being based upon the range of mismanagement metrics and which of the plurality of mismanagement and misconfiguration symptoms are available at a particular network granularity;

identifying, from the aggregation of the range of mismanagement metrics, one or more correlations between the plurality of mismanagement and misconfiguration symptoms and the range of mismanagement metrics;

from among the identified one or more correlations between the range of mismanagement metrics, determining a unified mismanagement metric for the computer network, the unified mismanagement metric indicating a network level of the mismanagement of the computer network that represents a susceptibility of the computer network to malicious cyber attacks as a combination of susceptibilities of the individual hosts to malicious cyber attacks; and storing the unified mismanagement metric for use in comparison to a listing of potential malicious cyber attacks.

2. The method of claim 1, wherein the range of mismanagement metrics associated with the individual hosts include one or more of Open Recursive Resolvers, DNS Source Port Randomization, Consistent A and PTR records, BGP Misconfiguration, Egress Filtering, Untrusted HTTPS Certificates, SMTP server relaying, Publicly-Available Out-of-band Management Cards, and open NTP servers.

3. The method of claim 1, wherein aggregating the range of mismanagement metrics associated with the individual hosts of the computer network at the particular network level granularity comprises aggregating the range of mismanagement metrics collected from the AS level of the computer network.

4. The method of claim 1, wherein aggregating the range of mismanagement metrics associated with the individual hosts of the computer network at the particular network level granularity comprises aggregating the range of mismanagement metrics collected from an administrative boundary determined for the computer network.

5. The method of claim 1, further comprising:
analyzing the network data collected in response to the queries in real time.

6. The method of claim 1, further comprising:
analyzing the network data collected in response to the queries in periodic intervals or in response to a triggering event.

7. The method of claim 1, further comprising:
correlating the unified mismanagement metric with any of a plurality of potential malicious cyber attacks.

8. The method of claim 7, wherein the plurality of potential malicious cyber attacks include one or more of spam attacks, phishing attacks, malware attacks, and active attacks.

9. The method of claim 7, wherein correlating the unified mismanagement metric with any of a plurality of potential malicious cyber attacks comprises:
aggregating a blacklist data table that stores data of the plurality of potential malicious cyber attacks;
aggregating, at an autonomous system level, IP addresses for the individual hosts within the computer network; and
identifying those IP addresses resulting in mismanagement metrics that correlate to the aggregated blacklist data table.

10. The method of claim 7, wherein correlating the unified mismanagement metric with any of a plurality of potential malicious cyber attacks comprises:
aggregating a blacklist data table that stores data of the plurality of potential malicious cyber attacks;
aggregating, at a predetermined administrative boundary, IP addresses for the individual hosts within the computer network; and
identifying those IP addresses resulting in mismanagement metrics that correlate to the aggregated blacklist data table.

11. The method of claim 1, further comprising:
comparing the unified network mismanagement metric for the computer network against mismanagement metrics for other computer networks; and
determining a risk analysis rating based on the comparison.

12. The method of claim 11, further comprising:
providing a warning to a user when the risk analysis rating is above a threshold value.

13. The method of claim 11, further comprising:
communicating the risk analysis rating to an automated network management policy tool configured to automatically adjust network policy for the computer network in response to a level of the risk analysis rating.

14. The method of claim 11, further comprising:
calculating a security rating based upon the risk analysis rating to give a third party auditing entity a real time assessment of security on the computer network.

15. A system for auditing a computer network to determine susceptibility to malicious cyber attacks, comprising:
one or more processors and one or more memories, the one or more memories storing instructions that when executed by the one or more processors, cause the one or more processors to:
actively query, in a monitoring module stored in the one or more memories, individual hosts of the computer network via data communications that are separate from data traffic sent to and received by the individual hosts during normal operation;
analyzing network data collected in response to the queries for a presence of a plurality of mismanagement and misconfiguration symptoms represented by a range of mismanagement metrics associated with the individual hosts within the computer network, the plurality of mismanagement and misconfiguration symptoms being indicative of a failure to implement adequate network security practices or a deviation from known best security practices;
aggregate, in an aggregation module stored in the one or more memories, the range of mismanagement metrics associated with the individual hosts within the computer network at a particular network level granularity including (i) an autonomous system (AS) level, (ii) a network prefix level, (iii) an enterprise network level, or (iv) an arbitrarily-defined network level, the particular network level granularity being based upon the range of mismanagement metrics and which of the plurality of mismanagement and misconfiguration symptoms are available at a particular network granularity;
identify, in a correlation module, from among the aggregation of the range of mismanagement metrics, one or more correlations between the plurality of mismanagement and misconfiguration symptoms and the range of mismanagement metrics;
from among the identified correlations between the range of mismanagement metrics, determine, in an assessment module, a unified mismanagement metric for the computer network, the unified mismanagement metric indicating a network level indication of the mismanagement of the computer network that represents a susceptibility of the computer network to malicious cyber attacks as a combination of susceptibilities of the individual hosts to malicious cyber attacks; and
store the unified mismanagement metric for use in comparison to a listing of potential malicious cyber attacks.

16. The system of claim 15, wherein the range of mismanagement metrics associated with the individual hosts include one or more of Open Recursive Resolvers, DNS Source Port Randomization, Consistent A and PTR records, BGP Misconfiguration, Egress Filtering, Untrusted HTTPS Certificates, SMTP server relaying, Publicly-Available Out-of-band Management Cards, and open NTP servers.

17. The system of claim 15, the one or more memories storing further instructions that when executed by the one or more processors, cause the one or more processors to:

aggregate the range of mismanagement metrics associated with the individual hosts of the computer network by aggregating the range of mismanagement metrics collected from the AS level of the computer network.

18. The system of claim 15, the one or more memories storing further instructions that when executed by the one or more processors, cause the one or more processors to:
aggregate the range of mismanagement metrics associated with the individual hosts of the computer network by aggregating the range of mismanagement metrics collected from an administrative boundary determined for the computer network.

19. The system of claim 15, the one or more memories storing further instructions that when executed by the one or more processors, cause the one or more processors to:
analyze the network data collected in response to the queries in real time.

20. The system of claim 15, the one or more memories storing further instructions that when executed by the one or more processors, cause the one or more processors to:
analyze the network data collected in response to the queries in periodic intervals or in response to a triggering event.

21. The system of claim 15, the one or more memories storing further instructions that when executed by the one or more processors, cause the one or more processors to:
correlate the unified mismanagement metric with any of a plurality of potential malicious cyber attacks.

22. The system of claim 21, wherein the plurality of potential malicious cyber attacks include one or more of spam attacks, phishing attacks, malware attacks, and active attacks.

23. The system of claim 21, the one or more memories storing further instructions that when executed by the one or more processors, cause the one or more processors to:
aggregate a blacklist data table that stores data of the plurality of potential malicious cyber attacks to provide an aggregated blacklist data table;
aggregate, at an autonomous system level, IP addresses for individual hosts within the computer network; and
identify those IP addresses resulting in mismanagement metrics that correlate to the aggregated blacklist data table.

24. The system of claim 21, the one or more memories storing further instructions that when executed by the one or more processors, cause the one or more processors to:
aggregate a blacklist data table that stores data of the plurality of potential malicious cyber attacks to provide an aggregated blacklist data table;
aggregate, at a predetermined administrative boundary, IP addresses for individual hosts within the computer network; and
identify those IP addresses resulting in mismanagement metrics that correlate to the aggregated blacklist data table.

25. The system of claim 15, the one or more memories storing further instructions that when executed by the one or more processors, cause the one or more processors to:
compare, in risk analysis module stored in the one or more memories, the unified network mismanagement metric for the computer network against mismanagement metrics for other computer networks; and
determine, in risk analysis module stored in the one or more memories, a risk analysis rating based on the comparison.

26. The system of claim 25, the one or more memories storing further instructions that when executed by the one or more processors, cause the one or more processors to:
provide a warning to a user when the risk analysis rating is above a threshold value.

27. The system of claim 25, the one or more memories storing further instructions that when executed by the one or more processors, cause the one or more processors to:
communicate the risk analysis rating to an automated network management policy tool configured to automatically adjust network policy for the computer network in response to a level of the risk analysis rating.

28. The system of claim 25, the one or more memories storing further instructions that when executed by the one or more processors, cause the one or more processors to:
calculate a security rating based upon the risk analysis rating to give a third party auditing entity a real time assessment of security on the computer network.

* * * * *

UNITED STATES PATENT AND TRADEMARK OFFICE
CERTIFICATE OF CORRECTION

PATENT NO. : 9,729,558 B2  
APPLICATION NO. : 14/627736  
DATED : August 8, 2017  
INVENTOR(S) : Mingyan Liu et al.

Page 1 of 1

It is certified that error appears in the above-identified patent and that said Letters Patent is hereby corrected as shown below:

In the Claims

Column 20, Line 39, Claim 1, delete "network" and insert -- network, --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*